(12) United States Patent
Smies et al.

(10) Patent No.: US 9,228,633 B2
(45) Date of Patent: Jan. 5, 2016

(54) ENGINE BALANCE SYSTEM

(75) Inventors: Michael E. Smies, Waldo, WI (US); Edward A. Uebelher, Oshkosh, WI (US)

(73) Assignee: Kohler Co., Kohler, WI (US)

( * ) Notice: Subject to any disclaimer, the term of this patent is extended or adjusted under 35 U.S.C. 154(b) by 1800 days.

(21) Appl. No.: 12/401,146

(22) Filed: Mar. 10, 2009

(65) Prior Publication Data
US 2009/0229559 A1 Sep. 17, 2009

Related U.S. Application Data

(60) Provisional application No. 61/035,677, filed on Mar. 11, 2008.

(51) Int. Cl.
F02B 75/06 (2006.01)
F16F 15/26 (2006.01)
F16C 3/20 (2006.01)

(52) U.S. Cl.
CPC .............. *F16F 15/26* (2013.01); *F02B 75/06* (2013.01); *F16C 3/20* (2013.01)

(58) Field of Classification Search
CPC .............. F16C 3/04; F16C 3/20; F16F 15/14; F16F 15/22; F16F 15/26; F02B 75/06; F02B 75/16
USPC ........ 123/192.2, 197.1, 197.3, 197.4; 74/603, 74/604
See application file for complete search history.

(56) References Cited

U.S. PATENT DOCUMENTS

| 3,457,804 A | 7/1969 | Harkness |
| 4,656,981 A | 4/1987 | Murata et al. |
| 4,819,592 A | 4/1989 | van Ligten |
| 4,819,593 A * | 4/1989 | Bruener et al. ............ 123/192.2 |
| 4,926,810 A | 5/1990 | Diehl et al. |
| 5,282,397 A * | 2/1994 | Harkness ................ F02B 75/16 123/192.1 |

(Continued)

FOREIGN PATENT DOCUMENTS

| CN | 1489677 A | 4/2004 |
| JP | 49012210 A | 2/1974 |

OTHER PUBLICATIONS

PCT/US2009/001547; Notification of Transmittal of International Preliminary Report on Patentability and Written Opinion of the International Searching Authority; Sep. 23, 2010; 7 pages.

(Continued)

*Primary Examiner* — Lindsay Low
*Assistant Examiner* — Grant Moubry
(74) *Attorney, Agent, or Firm* — Whyte Hirschboeck Dudek S.C.

(57) ABSTRACT

A balance system for implementation within an engine crankcase, as well as an engine employing such a system and a method of balancing forces as performed by such a system, are disclosed. In at least one embodiment, the balance system includes a crankshaft with at least one eccentric portion and a counterbalance assembly having at least one connecting arm and a counterbalance weight with first and second ends, where each of the at least one connecting arm includes a respective circular orifice that is positioned around and supported by a respective one of the at least one eccentric portion. The balance system further includes first and second hinged arms rotatably coupled proximate the first and second ends of the counterbalance weight, respectively, where the arms at least indirectly link the ends of the counterbalance weight to a portion of the engine crankcase and guide movement of the counterbalance weight.

19 Claims, 3 Drawing Sheets

(56) References Cited

U.S. PATENT DOCUMENTS

| | | | |
|---|---|---|---|
| 5,794,493 A * | 8/1998 | Bollig et al. | 74/603 |
| 5,927,242 A * | 7/1999 | Kollock | 123/192.2 |
| 6,260,532 B1 * | 7/2001 | Mendler | 123/192.2 |
| 6,295,962 B1 | 10/2001 | Walker | |
| 6,382,166 B1 | 5/2002 | Klika et al. | |
| 6,684,846 B1 * | 2/2004 | Rotter | 123/196 R |
| 6,874,458 B2 | 4/2005 | Rotter et al. | |
| 6,880,512 B2 | 4/2005 | Hashimoto et al. | |
| 7,040,273 B2 * | 5/2006 | Glinsner | 123/192.2 |
| 2003/0121489 A1 | 7/2003 | Rotter | |

OTHER PUBLICATIONS

Notification of Transmittal of the International Search Report and the Written Opinion of the International Searching Authority; Jul. 28, 2009; 12 pages.

First Office Action and English Translation for Chinese Application No. 200980109144 dated Feb. 12, 2012, 17 pages.

Second Office Action and English Translation for Chinese Application No. 200980109144 dated Jan. 7, 2013, 6 pages.

Third Office Action and English Translation for Chinese Application No. 200980109144 dated Jul. 1, 2013, 18 pages.

* cited by examiner

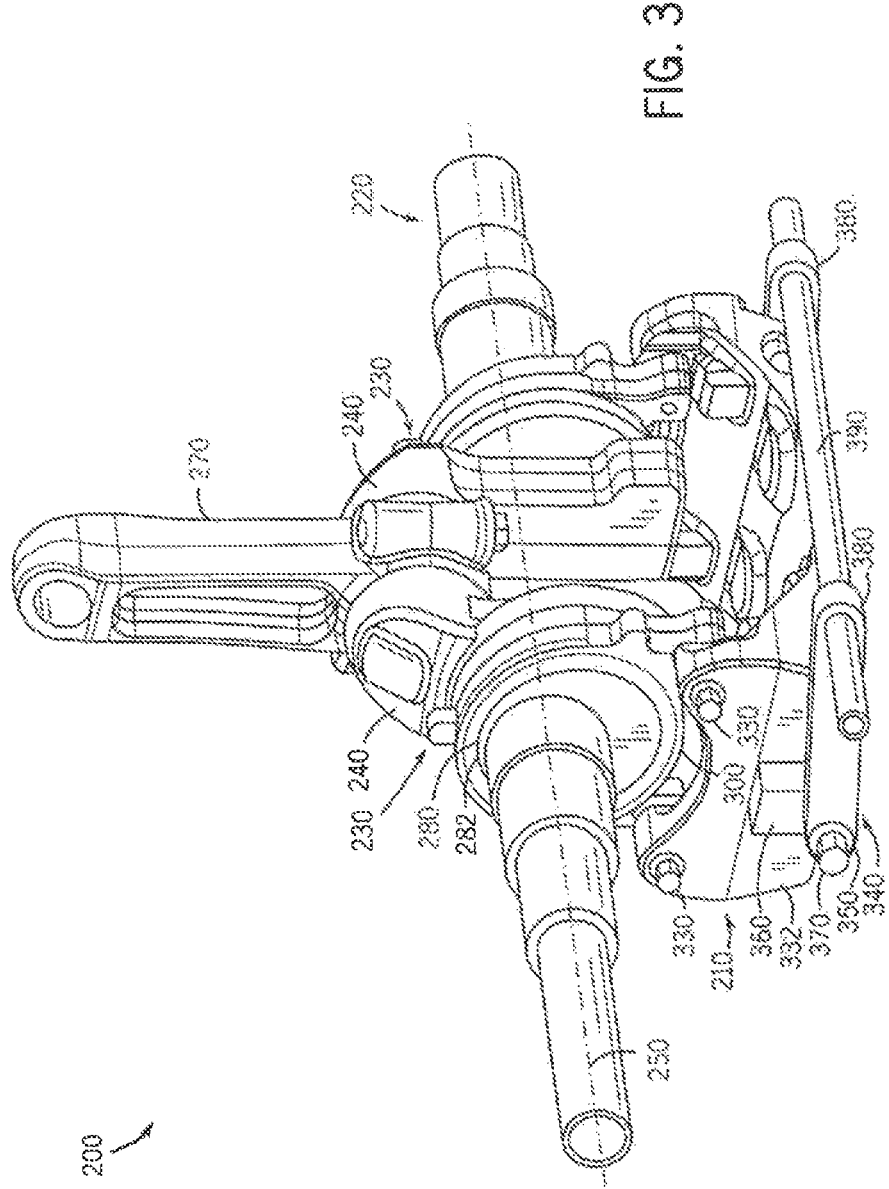

ENGINE BALANCE SYSTEM

CROSS-REFERENCE TO RELATED APPLICATIONS

This application claims the benefit of U.S. Provisional Patent Application No. 61/035,677 entitled "Engine Balance System" filed on Mar. 11, 2008, which is hereby incorporated by reference herein.

STATEMENT REGARDING FEDERALLY SPONSORED RESEARCH OR DEVELOPMENT

N/A

FIELD OF THE INVENTION

The present invention relates to single cylinder internal combustion engines such as those used to power lawnmowers, sump pumps, portable generators and other devices. In particular, the present invention relates to a balance system within such an engine that nullifies or reduces vibration of the engine resulting from reciprocation of the piston within the engine.

BACKGROUND OF THE INVENTION

A major cause of vibration in a single cylinder engine is piston reciprocation. The piston is started and stopped twice during each rotation of the crankshaft, and reactions to the forces that accelerate and decelerate the piston are imposed upon the engine body as vibration in directions generally parallel to the piston axis. When operated in a device such as a lawn mower, the engine produces vibrations that can be transmitted through the device to the operator. This vibration is uncomfortable and could produce operator fatigue. Even when operated in a device in which there is no issue of operator fatigue (e.g., sump pumps or portable generators), engine vibration is undesirable because it causes maintenance problems and tends to reduce the useful life of the machine.

To some extent such vibrations can be decreased by providing the engine with a counterweight fixed on its crankshaft, and located at the side of the crankshaft axis directly opposite the crankpin by which the piston (through the connecting rod) is connected to the crankshaft. Such a crankshaft counterweight arrangement, in which the counterweights rotate with the crankshaft, can be designed to cancel some or even all of the primary acceleration and deceleration forces on the piston assembly along the piston axis. However, the centrifugal force of such rotating crankshaft counterweights also has a component transverse to the piston axis that produces lateral vibration, the amount of which increases in direction proportion to the degree to which the crankshaft counterweights successfully cancel out the acceleration and deceleration forces on the piston assembly. For this reason, many single cylinder engines incorporate crankshaft counterweights having a mass that provides a condition of about "50% overbalance", such that the centrifugal force due to the counterweights has a component along the piston axis that is equal to about 50% of the acceleration and deceleration forces on the piston assembly. Yet the use of such counterweights having a 50% overbalance condition does not fully eliminate the undesirable vibration occurring in single cylinder engines.

For this reason, additional techniques have been employed to further reduce such vibration. A number of these techniques employ one or more additional counterweights that, in contrast to the crankshaft counterweights discussed above, do not rotate with the crankshaft but instead either reciprocate (that is, move back and forth in a strictly linear manner) with respect to the crankshaft or alternatively move back and forth relative to the crankshaft while also rotating somewhat (in a "wobbling" motion). Such counterweights often are coupled to the crankshaft by way of connecting arms, which have near ends coupled to the counterweights and far ends coupled to the crankshaft. In order that these counterweights move back and forth relative to the crankshaft in opposition to the motion of the piston, circular apertures at the far ends of the connecting arms are supported by eccentric journals on the crankshaft. As the crankshaft rotates, the eccentric journals rotate such that the centers of the eccentric journals rotate about the central axis of the crankshaft, and consequently the far ends of the connecting arms also move around the central axis of the crankshaft. This causes the near ends of the connecting arms, and the counterweights attached thereto, to move back and forth relative to the crankshaft.

Certain existing designs employing this second type of counterweight are configured to produce counterweight movement that includes both movement of the counterweight back and forth relative to the crankshaft as well as additional rotational movement relative to the crankshaft. In one conventional design, a pair of counterweights is not only connected to the crankshaft eccentrics by way of a pair of connecting arms, but also is connected the inside surface of one of the walls of the crankcase within which the counterweights are moving by way of a hinged arm that is rotatably coupled to both the wall of the crankcase and to the counterweights. The hinged arm generally serves to guide movement of the counterweights back and forth in relation to the crankshaft. The movement of the counterweights relative to the crankshaft is not strictly linear, however, since the point at which the hinged arm is attached to the counterweights must follow a nonlinear path determined by the radius formed by the hinged arm relative to the point on the crankcase about which the hinged arm rotates.

While the above-described conventional design for a balance system successfully balances to a high degree the forces associated with piston reciprocation (and thus diminishes undesirable vibrations associated therewith), this conventional design has certain disadvantages. In particular, in addition to experiencing motion back and forth relative to the crankshaft, as well as rotational motion about an axis parallel to the crankshaft axis, the counterweights coupled to the crankshaft by way of the connecting arms may also have a tendency during engine operation to experience torquing and even small amounts of rotation about axes perpendicular to the crankshaft axis, something which can result in further undesirable weight shifting and consequent vibrations in the engine. Such motion can result in relative leading/lagging in terms of the relative positions of the connecting arms with respect to the respective eccentric journals on which they ride, something which is exacerbated by the fact that different counterweights are coupled to the different eccentrics. Although the hinged arm coupling the counterweights to the crankcase does to some extent tend to counteract gross movements by the counterweights in these directions, the hinged arm is less able to prevent small movements in these directions, and thus is incapable of preventing some of the undesirable vibrations associated with such movements.

In view of the above discussion, therefore, it would be advantageous if an improved balancing system capable of being used in a single-cylinder internal combustion engine could be developed. In at least some such embodiments, it would be advantageous if the improved balancing system was designed so that any relative leading or lagging experienced in terms of the positioning of different connecting arms on their respective eccentrics was minimized, and so that any movements of the counterweights about axes other than those parallel to the crankshaft were reduced, such that associated weight shifting, vibrations, and other undesirable effects were less likely to occur than in conventional embodiments of balancing systems. It would further be advantageous if at least some embodiments of the improved balancing system were more easily manufactured and/or assembled than many conventional balancing systems.

SUMMARY OF THE INVENTION

The present inventors have recognized the above-described disadvantages associated with many conventional balance system designs. The present inventors have additionally recognized that improved performance can be achieved by a balance system if, in at least some embodiments, a counterweight of the balance system that is intended for movement back and forth with respect to the crankshaft is coupled to an inner wall of a crankcase not merely by way of a single hinged arm, but rather is coupled to an inner wall of the crankcase by way of a pair of hinged arms rotatably coupled respectively to opposite ends of the counterweight. By utilizing two hinged arms at opposite ends of the counterweight, the positioning of two connecting arms linking the counterweight to the crankshaft remain in substantially identical positions respectively relative to the respective crankshaft eccentrics on which they ride (rather than experiencing different leading or lagging positions). Additionally, undesirable rotational movements of the counterweight are reduced or eliminated, and associated weight shifting and vibrations thus can be reduced relative to what would occur if only one arm was used.

Further, in at least some such embodiments, to simplify manufacturing and assembly of the balance system (and to further reduce or eliminate leading/lagging and undesirable rotational movements as mentioned above), only a single counterweight is employed rather than multiple counterweights that are coupled to one another. Also, in at least some such embodiments, the hinged arms are coupled between the counterweight and a shaft mounted on the crankcase wall, rather than directly to two pivot locations on the crankcase wall. Additionally, in at least some embodiments, the connecting arms can be made of a different material than the counterweight and coupled to the counterweight by bolts or other fastening componentry. If an appropriate material (e.g., aluminum) is utilized to form the connecting arms, the inner surfaces of the orifices formed within the connecting arms can ride directly upon the crankshaft eccentrics, and consequently no additional bearings need be provided within the orifices of the connecting arms.

In at least one embodiment the present invention relates to a balance system for implementation within an engine crankcase. The balance system includes a crankshaft including a crank pin portion, at least one shaft portion, at least one crank arm portion coupling the crank pin portion to the at least one shaft portion, and at least one eccentric portion provided along the at least one shaft portion, where the crankshaft is further configured to be coupled to a piston by a connecting rod. The balance system also includes a counterbalance assembly having at least one connecting arm and a counterbalance weight with first and second ends, where each of the at least one connecting arm includes a respective circular orifice that is positioned around and supported by a respective one of the at least one eccentric portion. The balance system further includes first and second hinged arms rotatably coupled proximate the first and second ends of the counterbalance weight, respectively, where the first and second hinged arms at least indirectly link the first and second ends of the counterbalance weight to a portion of the engine crankcase and guide movement of the counterbalance weight.

Additionally, in at least one embodiment, the present invention relates to a single cylinder internal combustion engine. The engine includes a piston positioned within a cylinder for reciprocating movement therewithin, and a crankshaft including a crank pin connected to the piston by way of a connecting rod, and further including first and second eccentric portions provided on opposite sides of the crank pin. The engine further includes a counterbalance assembly having first and second connecting arms, a counterbalance weight, and means for coupling the connecting arms with the counterbalance weight, where each of the connecting arms includes a respective circular orifice that is positioned around and supported by a respective one of the eccentric portions. The engine additionally includes first and second hinged arms each having a respective first end and a respective second end, where the respective first ends of the first and second hinged arms are rotatably coupled proximate the first and second ends of the counterbalance weight, respectively, and means for coupling the second ends of the hinged arms to a portion of the engine crankcase, whereby the hinged arms guide movement of the counterbalance weight.

Further, in at least one embodiment, the present invention relates to a method of balancing forces provided by a piston to a crankshaft within a single cylinder internal combustion engine. The method includes rotating an eccentric portion supported by the crankshaft as the crankshaft rotates, and guiding a counterbalance assembly that is supported by the eccentric portion toward and away from the crankshaft along a path determined at least in part by first and second hinged arms linking a counterbalance weight of the counterbalance assembly to an engine crankcase of the engine. The first and second hinged arms are respectively coupled between the engine crankcase and first and second ends of the counterbalance weight taken along a counterbalance weight axis that is substantially parallel to a crankshaft axis, respectively, whereby rotational movements of the counterbalance weight about at least one rotational axis perpendicular to the crankshaft are substantially constrained by the hinged arms.

BRIEF DESCRIPTION OF THE DRAWINGS

FIG. 3 shows an assembled perspective view of the balance system of FIG. 2.

DETAILED DESCRIPTION OF THE PREFERRED EMBODIMENT

Figure 1:
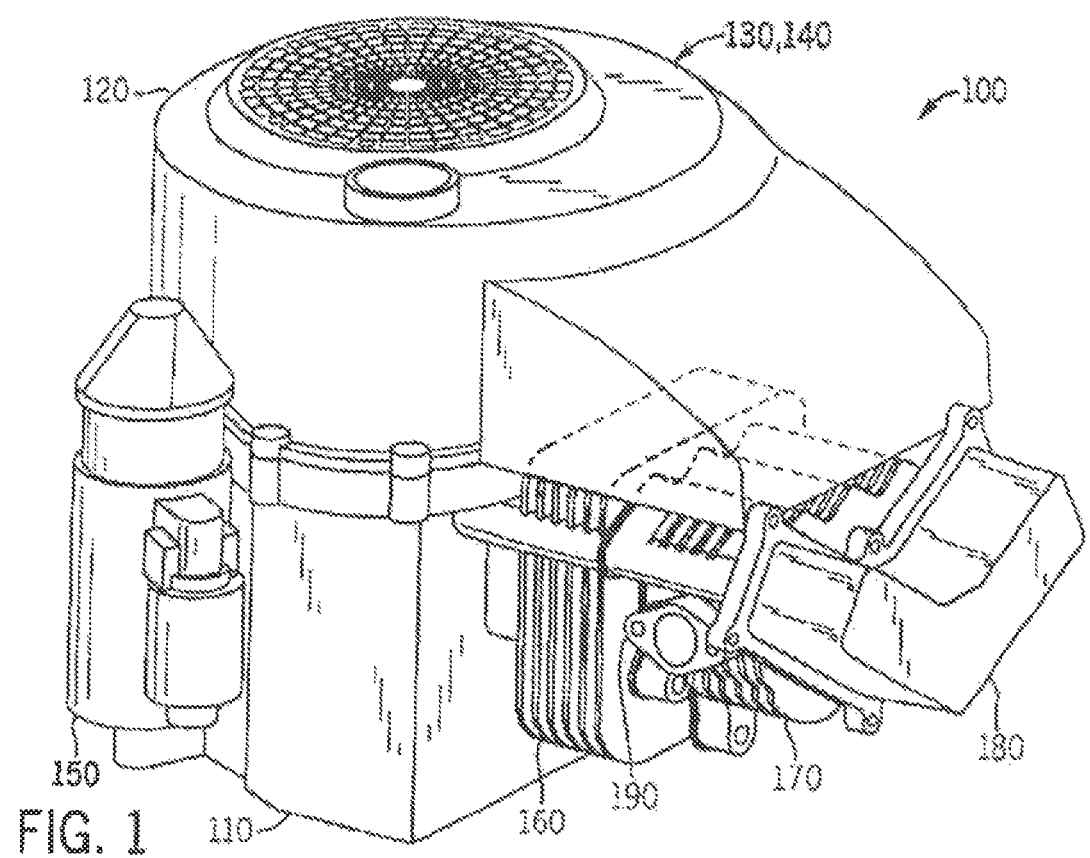
FIG. 1 is a perspective view of an engine within which can be employed a balance system in accordance with at least one embodiment of the invention.

Referring to FIG. 1, a single cylinder, 4-stroke, internal combustion engine 100 designed by Kohler Co. of Kohler, Wis. includes a crankcase 110 and a blower housing 120, inside of which are a fan 130 and a flywheel 140. The engine 100 further includes a starter 150, a cylinder 160, a cylinder head 170, and a rocker arm cover 180. Attached to the cylinder head 170 is an air exhaust port 190. During operation of the engine 100, a piston (not shown) moves back and forth in a linear manner (that is, reciprocates) within the cylinder 160 towards and away from the cylinder head 170. The movement of the piston in turn causes rotation of a crankshaft 220 (see FIG. 2), as well as rotation of the fan 130 and the flywheel 140, which are coupled to the crankshaft. The rotation of the fan 130 cools the engine, and the rotation of the flywheel 140 causes a relatively constant rotational momentum to be maintained. As will be described below in relation to FIGS. 2 and 3, the engine 100 further includes a balance system 200 that serves to fully or largely balance forces experienced by the engine due to reciprocation of the engine piston.

It will be understood that the engine 100 in the present embodiment is a vertical crankshaft engine, that is, the crankshaft 220 of the engine extends vertically (or substantially vertically) between a top side of the engine at which are positioned the fan 130 and flywheel 140, and a bottom side of the engine out of which the crankshaft extends such that the crankshaft can output power to a load. More particularly, in at least some embodiments, the engine 100 is a vertical crankshaft engine capable of outputting 15-20 horsepower for implementation in a variety of Small Off-Road Engines (SORE) including Class 1 and Class 2 small off-road engines such as, lawn mowers, lawn tractors and the like. For example, in some embodiments, the engine 100 can be an engine from the Courage Single family of engines available from the Kohler Company of Kohler, Wis.

Nevertheless, in alternate embodiments, the engine 100 can take a variety of other forms. For example, in some alternate embodiments, the engine 100 can also be implemented as a horizontal crankshaft engine, be designed to output greater or lesser amounts of power, and/or be implemented in a variety of other types of machines, e.g., snowblowers. Further, in alternate embodiments, the particular arrangement of parts within the engine 100 can vary from those shown and discussed above. Additional components not shown, such as an air intake port, oil and air filters etc., can also be present in the engine 100 in other embodiments. While the engine 100 is a single-cylinder engine, and while a balance system such as that described below with respect to FIGS. 2 and 3 is most highly suited for use in single-cylinder engines, in still other alternate embodiments of the present invention, the engine can be a muiticylinder engine.

Figure 2:
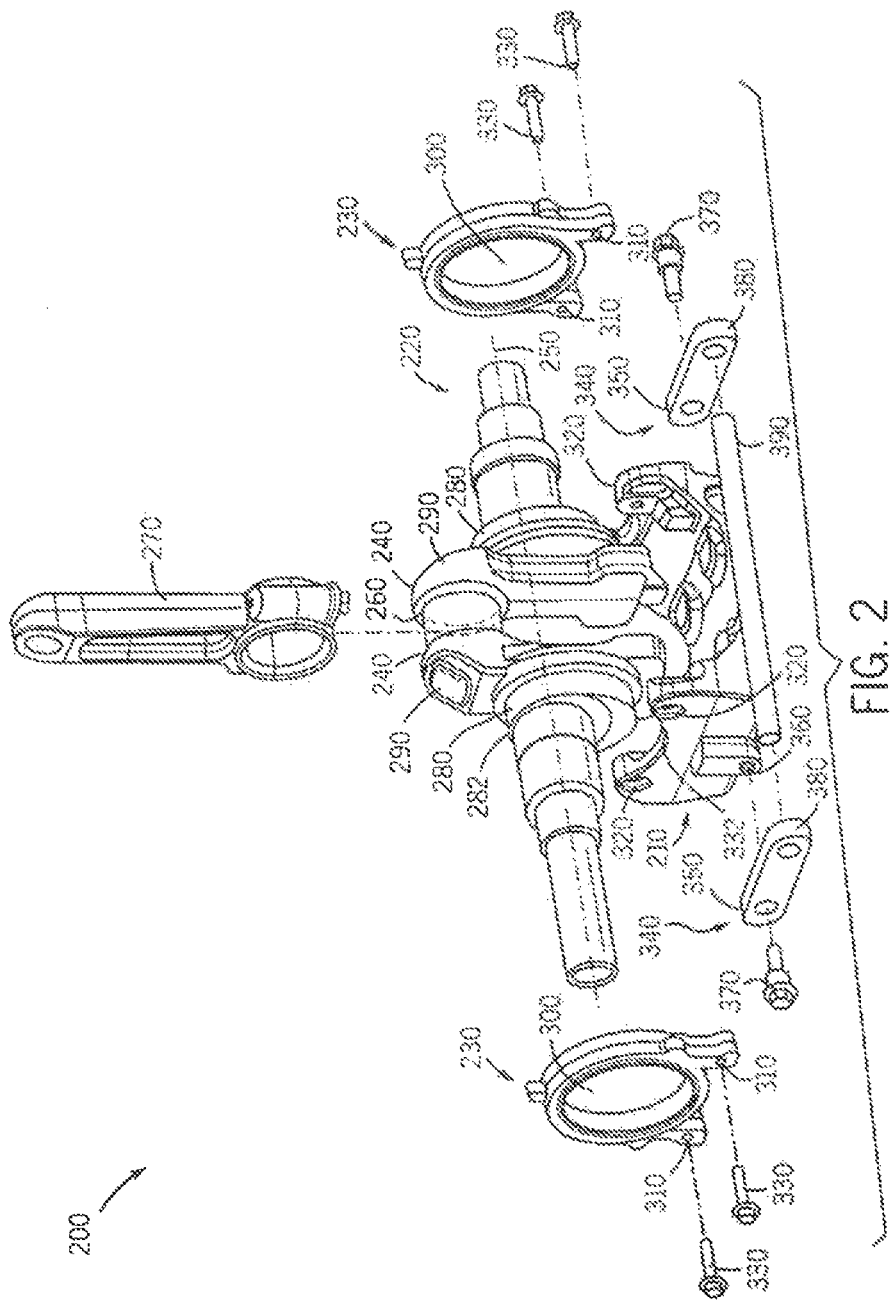
FIG. 2 shows a partially exploded perspective view of components of the balance system of the engine of FIG. 1.

Turning now to FIG. 2, a partially exploded perspective view of components of the balance system 200 capable of being employed in the engine 100 is shown, in accordance with at least some embodiments of the present invention. As shown, the balance system 200 includes both the crankshaft 220 and a balance assembly, which includes a counterweight 210 (which also can be referred to as a balance weight, counterbalance weight or brick) and a pair of upper and lower connecting arms (which also can be referred to as connecting arms or brackets) 230 that are capable of coupling the counterweight 210 to the crankshaft 220.

Further as shown, the crankshaft 220 includes a pair of spaced apart crank arms 240 extending transversely (radially outward) from a longitudinal axis of rotation 250 of the crankshaft, the crank arms being connected together by a crankpin 260. When assembled within the engine 100, a connecting rod 270 connects an engine piston (not shown) with the crankshaft 220 via the crankpin 260, the piston being positioned within the cylinder 160. Additionally as shown, the crankshaft 220 includes a pair of eccentrics 280 having eccentric journals or rims 282 that are positioned adjacent to outer portions 290 of the respective crank arms 240. Each of the eccentrics 280 and their respective eccentric journals/rims 282 are positioned onto the crankshaft 220 such that the eccentrics 280 have a central axis of rotation that is slightly offset from the longitudinal axis of rotation 250 of the crankshaft.

With the eccentrics 280 provided in this manner, the two connecting arms 230 are fitted onto opposing ends of the crankshaft 220. More particularly, each of the connecting arms 230 has a cavity (or orifice) portion 300 defining therein a respective circular (or substantially circular) cavity, where the circular cavity portion of each of the connecting arms can be slidingly fitted over a respective one of the eccentrics 280 of the crankshaft 220. The connecting arms 230 are mounted over the eccentrics 280 in a manner such that a lower of the two connecting arms 230 is positioned within or directly above an oil level along the bottom of the engine 100. Further, while in accordance with the present embodiment of the invention, the eccentrics 280 are separate pieces that are positioned onto the crankshaft 220, in alternate embodiments the eccentrics or the eccentric journals/rims 282 can be integrally formed with the crankshaft. Similarly, the various components of the crankshaft 220 can be integrally formed or formed from multiple separate pieces such as the crank pin 260 and the crank arms 240.

In addition to being mountable upon the eccentrics 280, the connecting arms 230 are further connected to upper and lower ends of the counterweight 210. Specifically, each of the connecting arms 230 further includes end portions 310 projecting downwardly from its respective circular cavity portion 300 that are connected to respective end portions 320 of the counterweight 210 by respective pairs of screws 330, thereby connecting the counterweight to the crankshaft 220. Upper and lower ends 332 of the counterweight 210 (e.g., proximate the end portions 320 of the counterweight) additionally have a generally U-shaped contour that is suitable for receiving therein the circular cavity portions 300 of the connecting arms 230. Assembly of the counterweight 210 to each of the connecting arms 230 involves placing the screws 330 for each connecting arm through corresponding pilot holes in the counterweight, and rotating the screws so as to engage threads provided within the connecting arms with respect to which the screws are inserted (albeit in alternate embodiments the screw connections can be reversed, such that the screws pass through holes in the connecting arms and the threads enter the counterweight). While in the present embodiment the pairs of screws 330 are employed to connect the connecting arms 230 with the counterweight 210, in other embodiments, a variety of other fasteners and engaging mechanisms including bolts, nuts and pins can be used (and other numbers of fasteners, rather than two per connecting arm, can also be used).

In addition to being coupled to the crankshaft 220 via the connecting arms 230, the counterweight 210 is also coupled to an inner surface of a sidewall of the crankcase 110 (see FIG. 1), specifically in a hinged manner by way of a pair of hinged arms 340. Further as shown, a first end portion 350 of each of the hinged arms 340 is rotatably coupled to a respective projected portion 360 at a respective one of the ends 332 of the counterweight 210 by way of a respective bolt (or screw) 370. Other fastening and/or engaging mechanisms for linking the hinged arms 340 to the counterweight 210 can be employed as well in alternate embodiments. Additionally, a second end portion 380 of each of the hinged arms 340 is rotatably connected to a hollow shaft 390 that extends within, and is supported by, the inner surface of the sidewall of the crankcase 110.

Depending upon the embodiment, the shaft 390 can be supported within the crankcase in a variety of manners. For example, in some embodiments, ends of the shaft 390 are positioned and fixed within (e.g., snapped into) corresponding slots within the crankcase wall. Also for example, the shaft 390 can be positioned to extend between a top of the crankcase 110, which can be a crankcase cover, and the bottom of the crankcase, at which oil sits. Although in the present embodiment each of the hinged arms 340 are rotatably supported upon the same shaft 390, in other embodiments the hinged arms can be directly or indirectly coupled to the crankcase (or other appropriate support fixture) in other manners as well. For example, in some alternate embodiments, the respective second end portions 380 of the hinged arms 340 are rotatably coupled to respective pivot extensions formed on the crankcase wall.

Referring still to FIG. 2, the counterweight 210 in the present embodiment is a single integral piece of metal, which is separate from the connecting arms 230. Manufacturing the counterweight 210 separately from the connecting arms 230 can in some cases simplify the manufacturing of both the counterweight and the connecting arms, in comparison with the manufacturing a balance system in which the counterweight and the connecting arms were integrally formed. Providing the counterweight 210 as a separate element distinct from the connecting arms 230 also can simplify the assembly procedure for the balance system 200. In at least some embodiments, the counterweight 210 is constructed out of metal, such as, steel and iron. In other embodiments, other metals and potentially rigid non-metals can be employed as well. The material selected for the counterweight 210 in particular should be of a density (and consequent mass) such that the counterweight can provide the desired piston reciprocation balancing.

Because the counterweight 210 is a separate piece relative to the connecting arms 230, the connecting arms 230 can be manufactured from a different, lighter material than the counterweight itself, such that the connecting arms 230 do not as significantly impact the balancing properties of the engine and also so that the connecting arms 230 are suitable for acting as the main bearings of the counterweight relative to the eccentrics 280 and crankshaft 220. For example, the connecting arms 230 can be made out of aluminum or an aluminum alloy to avoid or alleviate any negative consequences associated with the weight of counterweight 210. In some further embodiments, the connecting arms 230 can be made from an aluminum and silicon alloy.

By virtue of manufacturing the connecting arms 230 from one or more appropriate materials, the connecting arms 230 thus can be mounted directly onto the eccentrics 280, such that the inner surfaces of the cavity portions 300 directly interface the eccentric journals/rims 282 of the eccentrics, without any additional intermediate bearings. Typically, oil or other lubricant will be provided to the interfacing surfaces of the eccentrics 280 and the cavity portions 300 to facilitate proper relative sliding/rotational movement of those surfaces. It should be further mentioned that, although in the present embodiment the counterweight 210 and the connecting arms 230 are separate elements connected in operational association to each other and also to the crankshaft 220, this need not always be the case. In other embodiments, the counterweight 210 and the connecting arms 230 can be integrally formed with one another and/or with the crankshaft 220. In alternate embodiments, other types of bearing materials such as, magnesium alloy or other cast iron with press-in bearings can potentially be used for manufacturing the connecting arms 230.

Turning now to FIG. 3, the balance system 200 of FIG. 2 is shown to be assembled. In particular, the connecting arms 230 are shown to be mounted onto the eccentric journals/rims 282 of the eccentrics 280, and also are shown to be connected to the counterweight 210, such that the counterweight is assembled to the crankshaft 220 (the connecting rod 270 is also shown to be coupled to the crankpin 260). Additionally as shown, the hinged arms 340 are coupled both to the counterweight 210 and to the hollow shaft 390, which is understood in turn to be coupled to the crankcase 110. By virtue of providing the balance system 200 working in cooperation with the crankshaft 220, forces transferred from the piston (and, to some extent, the connecting rod 270) to the crankshaft related to the movement (and acceleration/deceleration of the piston) can be balanced or substantially balanced, so as to minimize or possibly eliminate undesirable vibrations associated with such forces.

More particularly, during operation as the crankshaft 220 rotates due to the reciprocating motion of the piston, the two connecting arms 230 move towards and away from the crankshaft in largely the same manner, due to the interaction of the eccentrics 280 with the circular cavity portions 300 of the connecting arms. The motion of the connecting arms 230 in turn causes the counterweight 210 to move towards and away from the crankshaft 220 at the same frequency as the rotation of the crankshaft. By virtue of the eccentricity of the eccentrics 280, and their interaction with the connecting arms 230 and the counterweight 210 during rotation of the crankshaft 220, the counterweight has a momentum in a direction that is 180 degrees out of phase with the direction of motion of the piston. As a result of the opposing motions of the counterweight 210 and the piston, forces produced by the piston and associated engine vibrations are effectively reduced. Although not of primary significance to the present balance system, it should also be understood that the rotation of portions of the crankshaft 220 (e.g., portions that form rotating counterweights, which can include the eccentrics 280) can further assist in this balancing effect.

In achieving the balancing afforded by the movement of the counterweight 210, the hinged arms 340 perform several significant roles. First, the hinged arms 340 guide movement of the counterweight 210 so that it generally involves movement toward and away from the crankshaft 220 but does not rotate around the crankshaft (e.g., due to friction between the connecting arms 230 and the eccentrics 280). The hinged arms 340 generally are synchronized with one another in their movements and how they guide the counterweight 210. At the same time, because the hinged arms 340 are rotatably coupled to the hollow shaft 390, the movement of the counterweight 210 is not strictly linear as it moves toward and away from the crankshaft 220 but rather follows (and, in particular, the axis of the bolts 370 follows) an arc path that maintains a constant radial distance (e.g., the length of the hinged arms 340) relative to the hollow shaft. Thus, due to the particular manner in which the counterweight 210 is coupled to the crankcase wall, the counterweight experiences some rotational or "wobbling" movement in addition to movement toward and away from the crankshaft 220. At the same time, due to the relatively small amount of rotational motion of the counterweight 210 introduced by the hinged arm 340 connections, the balancing capability of the counterweight is still substantial.

In addition to guiding the motion of the counterweight 210 back and forth relative to the crankshaft 220, the use of the pair of hinged arms 340 is particularly advantageous in additional respects. By virtue of coupling the counterweight 210 to the crankcase 110 via the pair of hinged arms 340 coupled to the opposite ends 332 of the counterweight 210, the alignment of the counterweight 210 relative to the crankshaft and the eccentrics 280 is more perfect than it would otherwise be if only a single hinged arm was used. In particular, the relative positioning of the connecting arms 230 with respect to their respective eccentrics 280 is maintained identical or substantially identical, such that the two connecting arms (and thus the ends of the counterweight 210) avoid experience leading or lagging behavior relative to one another. Further, undesirable shifting of the counterweight 210 (and the connecting arms 230) relative to the eccentrics, both in terms of along the longitudinal axis of rotation 250 of the crankshaft and in other directions, is reduced. Indeed, because of the use of the hinged arms 340, undesirable rotational movements of the counterweight 210 (and the connecting arms 230) about one or more axes perpendicular to the longitudinal axis of rotation 250 of the crankshaft 220 (e.g., about the longitudinal axis of the piston or about an axis perpendicular to both that piston axis and the crankshaft axis) is more completely avoided than would be the case. Thus, undesirable vibrations associated with such undesirable rotational movements are also more completely avoided.

In view of the above, therefore, it should be appreciated that embodiments of the present invention achieve a balance system that is capable of effectively balancing piston forces and eliminating undesirable engine vibrations associated therewith. This is true not only in terms of how the balance system guides a counterweight toward and away from a crankshaft, but also insofar as embodiments of the present invention employing two hinged arms more perfectly guide and position the counterweight so as to avoid or reduce the introduction of other vibrations that could otherwise occur due to undesirable shifting or rotating of the counterweight in response to torques and other stresses experienced during engine operation. Further, the dual linkage system with the hinged arms 340 improves the guidance of the counterweight 210 relative to conventional designs employing a single hinged arm/link, particularly insofar as leading or lagging of the different ends of the counterweight associated with the different eccentrics is avoided.

Advantageously, in at least some embodiments, the balance system employs only a single integral counterweight rather than two separate counterweight halves, thereby eliminating the possibility of any movement between the counterweight halves (which itself can produce undesirable vibrations or cause less perfect balancing). Also, by using connecting arms that are separate from the counterweight, materials that are lighter and more appropriate for directly contacting the eccentrics can be used to form the connecting rods.

The present invention is intended to encompass numerous variations of the embodiments described above. For example, while the hinged arms 340 are shown to be coupled to opposite ends of the counterweight 210, in alternate embodiments, the hinged arms need not be at absolute endpoints of the counterweight but rather could merely be positioned proximate the ends of the counterweight. In still other embodiments, more than two hinged arms could be provided to connect different points along the length of the counterweight to the crankshaft. Also, while the shaft 390 is described as being hollow, this need not always be the case.

Thus, it is specifically intended that the present invention not be limited to the embodiments and illustrations contained herein, but include modified forms of those embodiments including portions of the embodiments and combinations of elements of different embodiments as come within the scope of the following claims.

We claim:

1. A balance system for implementation within an engine crankcase, the balance system comprising:
   a crankshaft including a crank pin portion, at least one shaft portion, at least one crank arm portion coupling the crank pin portion to the at least one shaft portion, and at least one eccentric portion provided along the at least one shaft portion, wherein the crankshaft is further configured to be coupled to a connecting rod;
   a counterbalance assembly having at least one connecting arm and a counterbalance weight with first and second ends, wherein each of the at least one connecting arm includes a respective circular orifice that is positioned around and supported by a respective one of the at least one eccentric portion; and
   first and second hinged arms rotatably coupled proximate the first and second ends of the counterbalance weight, respectively, wherein the first and second hinged arms at least indirectly link the first and second ends of the counterbalance weight to a portion of the engine crankcase and guide movement of the counterbalance weight,
   wherein the at least one connecting arm includes first and second connecting arms that are respectively supported upon the first and second eccentric portions, respectively, and
   wherein the first and second connecting arms are affixed to the counterbalance weight proximate the first and second ends of the counterbalance weight, wherein a first plurality of fastening or engaging mechanisms is used to affix the first connecting arm to the counterbalance weight, and a second plurality of fastening or engaging mechanisms is used to affix the second connecting arm to the counterbalance weight.

2. The balance system of claim 1, wherein the at least one shaft portion includes first and second portions, wherein the at least one crank arm portion includes first and second crank arm portions, wherein the at least one eccentric portion includes first and second eccentric portions provided along the crankshaft on opposite sides of the crank pin portion.

3. The balance system of claim 2, wherein the counterbalance weight is a single integral weight.

4. The balance system of claim 1, wherein the first and second connecting arms are affixed to the counterbalance weight by way of at least one of bolts and screws that are the fastening or engaging mechanisms.

5. The balance system of claim 4, wherein a first pair of the screws is used to affix the first connecting arm to the counterbalance weight, and a second pair of the screws is used to affix the second connecting arm to the counterbalance weight.

6. The balance system of claim 5, wherein the screws are placed through pilot holes in the counterbalance weight and threads are provided within the connecting arms with respect to which the screws are inserted.

7. The balance system of claim 1, wherein each of the at least one connecting arm is made of at least one material selected from the group consisting of aluminum and an aluminum alloy.

8. The balance system of claim 7, wherein an inner surface of the respective circular orifice of each respective connecting arm is in direct contact with a respective outer surface of a respective one of the at least one eccentric portion, without any intermediate bearing.

9. The balance system of claim 7, wherein the at least one material includes an alloy including aluminum and silicon, and additionally wherein lubricant is provided to an interface between the at least one connecting arm and the at least one eccentric portion.

10. The balance system of claim 7, wherein the counterbalance weight is formed from an additional material that is denser than the at least one material.

11. The balance system of claim 10, wherein the additional material is steel.

12. The balance system of claim 1, wherein respective first ends of the first and second hinged arms are rotatably coupled to the first and second ends of the counterbalance weight, respectively, while respective second ends of the first and second hinged arms are rotatably coupled to a shaft that is in turn supported relative to the engine crankcase.

13. The balance system of claim 12, wherein the shaft is mounted relative to the engine crankcase by sliding ends of the shaft into corresponding slots formed within the engine crankcase.

14. The balance system of claim 1, wherein the first and second hinged arms guide the counterbalance weight so that it follows an arc-type path about an axis about which the hinged arms pivot as the counterbalance weight moves toward or away from the crankshaft.

15. The balance system of claim 1, wherein at least one rotating counterweight is formed as part of, or is fixed in relation to, the crankshaft, the at least one rotating counterweight rotating along with the crankshaft.

16. A single cylinder internal combustion engine comprising:
- a crankshaft including a crank pin connected to a connecting rod, and further including first and second eccentric portions provided on opposite sides of the crank pin;
- a counterbalance assembly having first and second connecting arms, a counterbalance weight, and means for coupling the connecting arms with the counterbalance weight, wherein each of the connecting arms includes a respective circular orifice that is positioned around and supported by a respective one of the eccentric portions;
- first and second hinged arms each having a respective first end and a respective second end, wherein the respective first ends of the first and second hinged arms are rotatably coupled proximate the first and second ends of the counterbalance weight, respectively; and
- means for rotatably coupling the second ends of the hinged arms to a portion of the engine crankcase, whereby the hinged arms guide movement of the counterbalance weight.

17. The single cylinder internal combustion engine of claim 16, wherein the means for coupling includes at least one of a shaft that is affixed to the portion of the engine crankcase and to which the second ends of each of the hinged arms are rotatably coupled, and a pair of discrete pivot connections formed upon the portion of the engine crankcase, the portion being an inner surface of a wall of the engine crankcase.

18. A method of balancing forces within a single cylinder internal combustion engine, the method comprising:
- rotating an eccentric portion supported by the crankshaft as the crankshaft rotates;
- guiding a counterbalance assembly that is supported by the eccentric portion toward and away from the crankshaft along a path determined at least in part by first and second hinged arms linking a counterbalance weight of the counterbalance assembly to an engine crankcase of the engine, wherein respective first ends of the first and second hinged arms are rotatably coupled to the first and second ends of the counterbalance weight, respectively, and respective second ends of the first and second hinged arms are rotatably coupled to first and second locations on the engine crankcase, respectively,
- wherein the first and second hinged arms are respectively coupled between the engine crankcase and first and second ends of the counterbalance weight taken along a counterbalance weight axis that is substantially parallel to a crankshaft axis, respectively,
- whereby rotational movements of the counterbalance weight about at least one rotational axis perpendicular to the crankshaft are substantially constrained by the hinged arms.

19. The method of claim 18, wherein the first and second connecting arms are affixed to the counterbalance weight proximate the first and second ends of the counterbalance weight, wherein a first plurality of fastening or engaging mechanisms is used to affix the first connecting arm to the counterbalance weight, and a second plurality of listening or engaging mechanisms is used to affix the second connecting arm to the counterbalance weight.

* * * * *